United States Patent Office 3,645,901
Patented Feb. 29, 1972

3,645,901
WATER-IN-OIL HYDRAULIC FLUID
Howard J. Matson, Harvey, Ill., assignor to
Atlantic Richfield Company
No Drawing. Filed Oct. 3, 1968, Ser. No. 764,964
Int. Cl. C09k 3/00
U.S. Cl. 252—75                                  18 Claims

ABSTRACT OF THE DISCLOSURE

Fire resistant, water-in-oil emulsions suitable for use as hydraulic fluids and having improved wear resistance over a wide range of operating conditions, including high pressure conditions, are obtained by incorporating anti-wear additives into the oil phase and certain additives which exhibit anti-wear properties in the water phase. The water phase anti-wear additives include the alkanolamine salts of boric acid and the trialkanolamine borates.

---

This invention relates to improved fire resistant hydraulic fluids. More particularly, the invention relates to fire resistant, water-in-oil emulsions suitable for use in transmitting hydraulic power, in which the emulsions contain anti-wear additives in the oil phase as well as certain agents in the water phase to provide improved wear resistance over a wide range of operatnig conditions, including high pressure conditions.

In recent years an increased emphasis on industrial safety has stimulated development of fire resistant hydraulic fluids for use in exposed fire hazard areas. Petroleum oils have historically found wide use as hydraulic fluids but under certain conditions, such as where leakage or line rupture in the hydraulic system will expose the fluid to an ignition source, petroleum hydraulic fluids have not been suitable due to their low fire resistance. Various compositions have therefore been developed which were intended to duplicate the performance of petroleum hydraulic fluids but without the flammability hazard present in the petroleum oils. These compositions include synthetic fluids such as phosphate esters and chlorinated hydrocarbons, water-glycol solutions, mineral oil with flame snuffer additives and emulsions of oil and water. The synthetic fluids have not been satisfactory in that they have an adverse effect on seals, hoses, packings and paint and such fluids are also highly toxic. Water-glycol fluids are less toxic but also have a deleterious effect on seals, packings and paints. The addition of flame snuffers such as chlorinated hydrocarbons to mineral oil has also not proven entirely satisfactory. Excessively large amounts, up to 40 percent or more, of the latter materials in the oil are required in order to produce any significant effect on flammability characteristics and such concentrations can produce systems which again are highly toxic. The chlorinated hydrocarbon additives also tend to hydrolyze to produce corrosive materials. Economic considerations also dictate against the use of either the synthetic fluids, water-glycol fluids or the mineral oil-flame snuffer combinations as the cost of these compositions can run to ten times or more that of the petroleum fluids.

A number of compositions comprising emulsions of oil and water have been employed as hydraulic fluids. These emulsions may be either emulsions of oil in water with water as the continuous phase, or of water in oil with a continuous oil phase. Oil-in-water emulsions are not widely used as hydraulic fluids as such emulsions allow extremely high wear, lack long term corrosion protection and are generally satisfactory only where water alone would be adequate. Water-in-oil emulsions, on the other hand, have been quite useful in hydraulic applications, such emulsions retaining many of the desirable characteristics of the base oil used to form the emulsion. Wear of parts has remained a major problem with the water-in-oil emulsions, however, and this is apparently due to the water content since the wear problem is not normally encountered with regular mineral oil hydraulic fluids. Wear of parts has been particularly critical in high pressure operations, i.e., about 1000 p.s.i. At pressures of about 1000 p.s.i., emulsion fluids heretofore available have not maintained the necessary lubricity to prevent rapid wear and premature replacement of essential hydraulic pump parts. Use of such fluids at 1000 p.s.i. has typically resulted in total ring and vane weight losses of about 200 to 1000 mg. after operating for 250 hours in a 2 g.p.m. vane pump. Such weight losses indicate that the lubricating properties of these prior fluids border on being unsatisfactory at pressures of 1000 p.s.i., in that minor variations in surface finish or clearance of critical moving parts, for example, could result in a totally inoperable pump.

The water-in-oil emulsions of this invention are thus a significant improvement over prior emulsions in that the present emulsions have superior antiwear characteristics, while maintaining good stability over a wide temperature range and, in addition, providing rust and corrosion protection without adversely affecting seals, packings, hoses and other components of the hydraulic system. In addition, these emulsions maintain superior antiwear characteristics under conditions of high pressure, in the range of about 1000 to 1500 p.s.i. These high pressure antiwear characteristics are achieved by incorporating certain additives into the water phase of water-in-oil fire resistant emulsions. These additives include the alkanolamine salts of boric acid and the trialkanolamine borates.

The emulsions of this invention have water dispersed in a mineral oil phase and frequently the emulsions contain abuot 20 to 80, preferably about 30 to 50, percent water and about 20 to 80, preferably 50 to 70, percent mineral oil, these percentages being based on the total water and oil. The oil phase contains an additive which is effective to give the desired water-in-oil emulsion, as well as an oil-soluble anti-wear or extreme pressure agent. The emulsifier and anti-wear agents are present in small amounts sufficient to serve their respective functions. The water in the emulsion has incorporated therein a small amount of a water-soluble agent which is an alkanolamine salt of boric acid or a trialkanolamine borate. These water soluble additives have been found to improve the lubricity and antiwear characteristics of the emulsion and one or more of these agents is employed in an amount sufficient to impart the desired properties to the emulsion. For example, the boric acid salt or borate can be present in an amount of about 0.1 to 10, preferably about 0.5 to 5, weight percent based on the total of the mineral oil and water in the emulsion. The emulsion may also contain minor amounts of other additives such as, for example, pour point depressants, anti-foam agents, oxidation inhibitors and rust inhibitors in the oil phase and freezing point depressants, rust inhibitors and metal deactivators in the water phase.

The antiwear additives which can be incorporated into the water phase of the emulsions include the alkanolamine salts of boric acid and the trialkanolamine borates. The alkanolamine salts of boric acid may be added in the form of an alkanolamine and boric acid, for instance, in a mole ratio of alkanolamine to boric acid of about 0.5:1 to 2:1. Suitable alkanolamines include the mono-, di- and triethanolamines with triethanolamine particularly preferred. Although the ethanolamines are preferred, other lower alkanolamines including methyl diethanolamine and triisopropanolamine may also be employed. Addition of boric acid or alkanolamine separately to the water phase produces no improvement in wear performance and indeed, when boric acid is added alone, the amount of wear is increased over systems without additives in the water phase.

The trialkanolamine borates employed are water-soluble in the amounts employed and have the following structure:

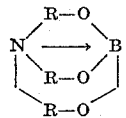

wherein R is an aliphatic hydrocarbon group, for instance, of 1 to 5 carbon atoms, preferably saturated. An especially suitable antiwear additive is triisopropanolamine borate although other tri-lower alkanolamine borates could be used.

The mineral oil base stock employed in the present invention is a hydrocarbon oil of lubricating viscosity, for instance, having a viscosity from about 35 SUS at 100° F. to about 250 SUS at 210° F. The base oil may be derived from paraffinic, naphthenic, asphaltic or mixed base petroleum crude oils and, if desired, a blend of solvent-treated Mid-Continent neutral and bright stocks may be employed. Although the emulsion may contain from about 20 to 80 weight percent of this oil based on the oil plus the water, it is preferred that the total oil phase, i.e., the oil plus the oil-soluble additives, be less than about 70 weight percent of the total emulsion in order that there may be a sufficiently large water phase to provide fire resistance. The most desirable base oils have a viscosity in the range of about 50 to 150 SUS at 100° F. with viscosities of about 70–110 SUS at 100° F. being preferred. Table I illustrates the effect of base oil viscosity on the final viscosity of typical emulsions of this invention.

TABLE I

Viscosity (SUS at 100° F.)

| Oil phase (oil and additives): | Emulsion (43% H$_2$O—57% oil) |
|---|---|
| 85.6 | 344 |
| 105.8 | 440 |
| 127.6 | 556 |
| 160 | 709 |
| 205 | 800 |
| 520 | 2130 |

Table II illustrates the effect of water content on final viscosity of typical emulsions of this invention.

TABLE II

Viscosity (SUS at 100° F.)

| H$_2$O, weight percent: | Emulsion (oil phase=100 SUS) |
|---|---|
| 0 | 100 |
| 10 | 157 |
| 20 | 202 |
| 30 | 267 |
| 40 | 390 |
| 50 | 820 |
| 60 | 3500 |

The emulsifier employed in the compositions of this invention can be selected from a number of oil-soluble materials known to develop water-in-oil emulsions, including, for example, aromatic sulfonates such as calcium or barium petroleum sulfonates; calcium or amine salts of alkylaryl- or alkylpolyethyleneoxy phosphate ester acids, and fatty acid esters and polyethyleneoxy fatty acid esters of sorbitol. A particularly useful emulsifier can be made using a mixture of about nine parts sorbitan monooleate and one part polyoxyethylene sorbitan trioleate. These two fatty acid esters of sorbitol are available commercially as Span 80 and Tween 85, respectively. This emulsifier will often be employed in amounts of about 0.1 to 10, preferably about 0.5 to 5, weight percent, based on the oil phase, to provide compositions which readily form water-in-oil emulsions when mixed with water.

Span 80 is an example of the long chain fatty acid partial esters of hexitol anhydrides which can be used in this invention and comprises essentially sorbitan monooleate. Span 80 is an oily liquid having a flash point of about 410° F., a fire point of about 545° F. and a specific gravity of about 1.00 to 1.05. The long chain fatty acids which are employed in producing both the fatty acid partial esters of hexitol anhydrides and their polyalkylene derivatives contain about 12 to 24 carbon atoms per molecule. The acids can be saturated or unsaturated and include, for example, lauric, palmitic, stearic and oleic acids. By "hexitol anhydride" is meant inner ethers having one cyclic oxygen per ring derivable from a hexahydric alcohol by intermolecular condensation and includes the monoanhydro and dianhydro derivatives, i.e., hexides, hexitans, mannides, mannitans, and the like. By "partial ester" is meant that the hydroxy groups of the anhydride are not all esterified; mono-, di- and triesters and mixtures thereof are preferred and these can be simple or mixed esters.

Tween 85 is a polyoxyalkylene derivative of hexitol anhydride partial long chain fatty acid ester. This derivative is the reaction product of about five moles of ethylene oxide and one mole of sorbitan trioleate and is an oily liquid at 25° C. having a flash point of about 565° F., a fire point of about 645° F. and a specific gravity of about 1.00 to 1.05. Such reaction products containing from about 2 to 25 moles or more of ethylene oxide per mole of the trioleate are especially preferred.

The calcium or barium sulfonates which can be employed in the compositions of this invention include those obtained by neutralizing oil-soluble aromatic sulfonic acids which can be of the synthetic variety or obtained by treatment of liquid petroleum oil fractions. More particularly, a gas oil or lube oil fraction of petroleum is contacted with oleum, sulfur trioxide or other sulfonating agent, the resulting sludge layer is separated and the mahogany sulfonic acids contained in the oil layer are neutralized with lime or barium oxide, as appropriate, in water. These sulfonates can be produced by various methods to provide normal or basic sulfonates. When the sulfonate is basic, it is preferred that at least about 1.1 times the amount of calcium or at least about 1.5 times the amount of barium, as appropriate, be present than is needed to provide a neutral or normal sulfonate. A carbonated sulfonate which can be employed may be obtained by conttacting the mahogany sulfonate, e.g., a basic barium sulfonate, with carbon dioxide until the strong basicity of the sulfonate to phenolphthalein is reduced and a final pH of about 7 to 8.5 is obtained. This reaction can be carried out, for example, by introducing the sulfonate to the top of a packed column and then feeding carbon dioxide to the bottom of the tower. The carbonate mahogany sulfonate is then recovered and vacuum dried to obtain the final product. The sulfonate usually contains unreacted lubricating oil which can be added to these compositions as part of the base oil.

The oil-soluble phosphate ester acids which can be employed can be, for instance, primary, secondary or tertiary esters of phosphoric acid and a hydroxyl compound which can be exemplified by the C$_5$–C$_{30}$ alkanols, phenols, including the alkylmonophenols, and monoalkyl-, monoaryl- and monoarylalkylethers of polyalkylene glycols. These phosphate compounds include those corresponding to the following general formula:

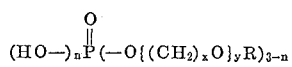

wherein R is a hydrocarbon radical having about 1 to 30, preferably 8 to 18, carbon atoms, $x$ equals 2 to 10, preferably 2, $y$ is 0 to 20, preferably 2 to 8, and $n$ is 0 to 2. The R groups can be alkyl, aryl or mixed alkyl-aryl radicals. These phosphate ester acids are generally employed in the form of calcium or amine salts in order to solubilize the ester in the oil.

Phosphate ester acids useful in the emulsions of the present invention include, for example, trioctyl phosphate, oxo-tridecyl phosphate, mixtures of mono- and dilauryl phosphate, lauryl polyethyleneoxy phosphate esters, nonylphenylpolyethyleneoxy phosphate esters and the like. Methods of preparation of the phosphate esters suitable for use in the compositions of the present invention appear in abundance in the prior art. The preparation of phosphate esters of branched chain (oxo) alcohols, for example, is disclosed in U.S. Pat. 3,033,889 to Chiddix et al. while the preparation of suitable alkyl, aryl and mixed aryl-alkyl polyethyleneoxy phosphate esters is described in U.S. Pats. Nos. 3,004,056 to Nunn et al. and 3,004,057 to Nunn.

Among the materials that can be employed as extreme pressure or antiwear additives in the oil phase of the emulsions of this invention are the oil-soluble metal dialkyl dithiophosphates. In general, these metal dithiophosphates are diesters and contain about 3 to 18 carbon atoms in the organic radicals, preferably 3 to 10 carbon atoms. Metal dithiophosphates can be made by known procedures, for example, by contacting the reaction product of a suitable alcohol and phosphorus pentasulfide with a metal oxide, for example, zinc oxide. Elements having atomic numbers from 28 through 30 can be employed with advantage as the metal component of the dithiophosphates. The oil-soluble extreme pressure additive can often be present in the emulsion in an amount of about 0.1 to 10, preferably about 0.5 to 5 weight percent based on the mineral oil component.

The various components of the emulsions of this invention are subject to variation, both in type and amount of additive used to perform a specific function. For example, wax acid esters can be employed as emulsifiers, sulfurized or phosphosulfurized fats or metal dithiocarbamates can be used as extreme pressure-antiwear additives, alkylene bis (alkyl phenols) can be used as antioxidants and amines salts of acids can be employed as rust inhibitors.

The following examples are illustrative of the compositions of this invention.

EXAMPLE I

Several water-in-oil emulsions were prepared by first dissolving the emulsifiers and other oil-soluble additives in the oil, then slowly adding the water phase to this oil blend using vigorous agitation. The water with the water-soluble additive may be added in the form of steam or as a spray. Agitation may be provided by homogenizers, high speed stirrers or sonic vibrators. It is often desirable to recirculate the emulsion while adding the water. Table III shows the wear characteristics for various water-in-oil emulsions, numbers 3, 4 and 5 being emulsions of this invention and showing less than 50% of the wear at 250 hours than similar compositions having no additive in the water phase or materials other than the water-soluble additives of this invention.

TABLE III.—WATER-IN-OIL EMULSIONS

| | Emulsion number | | | | | | |
|---|---|---|---|---|---|---|---|
| | 1 | 2 | 3 | 4 | 5 | 6 | 7 |
| Component: | | | | | | | |
| Oil phase, wt. percent of total emulsion: | | | | | | | |
| Mineral oil [1] | 44.5 | 51.0 | 49.5 | 48.8 | 48.0 | 51.0 | 4.8 |
| Emulsifier [2] | 6.0 | | | | | | |
| Calcium sulfonate [3] | 2.9 | | | | | | |
| Nickel-zinc dialkyl DTP [4] | 3.6 | | | | | | |
| Emulsifier-antiwear additive [5] | | 6.5 | 6.0 | 6.0 | 6.0 | 6.0 | 6.0 |
| Water phase, wt. percent of total emulsion: | | | | | | | |
| Water (Chicago tap) | 43.0 | 42.5 | 42.5 | 42.0 | 42.0 | 42.0 | 42.0 |
| Triisopropanolamine borate | | | 2.0 | | | | |
| Boric acid | | | | 1.0 | 1.0 | 1.0 | |
| Triethanolamine | | | | 2.2 | 3.0 | | 2.2 |
| Hydraulic pump test number [6] | 216 | 180 | 207 | 220 | 224 | 219 | 223 |
| Total weight loss, mg. (ring and vanes): | | | | | | | |
| 25 hours | 76 | 89 | 44 | 6 | 17 | | 19 |
| 50 hours | 123 | 142 | 62 | 12 | 23 | 457 | 34 |
| 125 hours | 155 | 188 | 82 | 34 | 26 | | 90 |
| 250 hours | 186 | 208 | 92 | 63 | 29 | | 269 |
| Percent weight loss, 250 hours | 0.09 | 0.10 | 0.043 | 0.029 | 0.014 | | 0.13 |

[1] Solvent refined, 95 VI Mid-Continent neutral having a viscosity of about 100 SUS at 100° F.
[2] Span 80-Tween 85 combination in a weight ratio of 9:1.
[3] Basic calcium petroleum sulfonate, typically containing 11 weight percent calcium and 50-50 weight percent oil.
[4] Complex metal dialkyl ($C_4$ and $C_6$) dithiophosphates containing about 1.5% nickel and 2.0% zinc.
[5] A combination containing barium sulfonate-zinc dithiophosphate analyzing: barium 3.02 wt. percent, zinc 0.71 wt. percent, phosphorous 0.78 wt. percent and sulfur 1.26 wt. percent.
[6] Vickers 104E pump, 2 g.p.m. delivery, 1000 p.s.i.g., 150° F., 1200 r.p.m.

From Table III it is evident that the wear characteristics of Emulsions Nos. 1 and 2, typical hydraulic fluids containing no additives in the water phase, are much inferior to the wear characteristics of either Emulsion No. 3 with the triisopropanolamine borate additive in the water phase or Emulsions Nos. 4 and 5 with the mixture of boric acid and triethanolamine in the water phase. The tests on Emulsions Nos. 6 and 7 show the unsuitability of boric acid or triethanolamine alone. Test results similar to those obtained with Emulsions 3 to 5 can also be reached by including in the water phase of Emulsion No. 1, boric acid and triethanolamine or trrisopropanolamine borate in the amounts used in Emulsions 3, 4 and 5.

EXAMPLE II

Another composition of this invention was prepared having the components shown in Table IV below.

TABLE IV

| Component | Weight percent of total emulsion |
|---|---|
| Oil phase: | |
| Mineral oil (80 SUS at 100° F.) | 46.2 |
| Emulsifier=antiwear additive [1] | 6.5 |
| Acryloid 150 [2] | 0.1 |
| Water phase: | |
| Water | 42.0 |
| Boric acid | 1.0 |
| Triethanolamine | 2.2 |
| Ethylene glycol | 2.0 |
| Dye (Alphazurine A) | +0.01 |

[1] See Table III, footnote 5.
[2] A viscous concentrate of methacrylate copolymer in a 150 SUS at 100° F. solvent refined neutral oil.

This composition had a viscosity of 450 SUS at 100° F., a pour point of −35° F. and a Brookfield viscosity at 0° F. of 3200 cps. The low temperature physical properties are interesting in that although water freezes at 32° F. and the mineral oil employed had a pour point of about 5° F., the pour point of the total composition was about −35° F. The composition showed good thermal stability, remaining stable after 21 days of cycling between −5° F. and 80° F. Results of the hydraulic pump wear test as performed in Example I showed wear of less than 125 mg. at 1000 p.s.i. after 1000 hours. This compares with a similar amount of wear after only 50 hours in the case of Emulsion No. 1 in Table III. This composition was further evaluated in a die casting machine incorporating a 1500 p.s.i. hydraulic system. At such high pressures typical water-in-oil emulsions without water phase antiwear additives, such as Emulsion No. 1 of Table III, have operated for only a few hours to four days maximum before pump replacement was required due to excessive wear. The composition of Table IV showed negligible wear and remained in perfect operating condition after operating for more than six months.

It is claimed:

1. A stable, water-in-oil emulsion suitable for use as a hydraulic fluid at high pressures consisting essentially of an emulsion having water dispersed in a mineral oil of lubricating viscosity, said emulsion containing small effective amounts of oil soluble emulsifier capable of emulsifying said water in said oil and an oil soluble extreme pressure agent, said emulsion also containing a water-soluble agent selected from the group consisting of tri-lower alkanolamine borates and lower alkanolamine salts of boric acid in an amount sufficient to improve the antiwear properties of the emulsion within the range of from about 0.1% to about 10% by weight based on the total of said oil and said water.

2. The emulsion of claim 1 having about 20 to 80 weight percent water and about 20 to 80 weight percent mineral oil, based on the total weight of the water and mineral oil in the emulsion.

3. The emulsion of claim 1 in which the mineral oil employed has a viscosity of about 50 to 150 SUS at 100° F.

4. The emulsion of claim 1 in which the water-soluble agent is triisopropanolamine borate.

5. The emulsion of claim 4 in which triisopropanolamine borate is employed in an amount of about 0.5 to 5 weight percent, based on the total weight of the mineral oil and water in the emulsion.

6. The emulsion of claim 1 in which the water-soluble agent is triethanolamine salt of boric acid.

7. The emulsion of claim 6 in which the triethanolamine salt of boric acid is employed in an amount of about 0.5 to 5 weight percent, based on the total weight of the mineral oil and water in the emulsion.

8. A stable, water-in-oil emulsion suitable for use as a hydraulic fluid at high pressures consisting essentially of an emulsion having about 20 to 80 weight percent water dispersed in about 20 to 80 weight percent mineral oil of lubricating viscosity, said emulsion containing a small amount effective to disperse said water in said oil of an oil-soluble emulsifier selected from the group consisting of calcium aromatic sulfonates, barium aromatic sulfonates, polyoxyethylene derivatives of hexitol anhydride long chain fatty acid mono-esters containing about 2 to 25 moles of ethylene oxide per mole of ester, and long chain fatty acid tri-esters of hexitol anhydride, wherein the fatty acid portion of said partial esters contains 12 to 24 carbon atoms per molecule, a small amount sufficient to impart antiwear properties to said emulsion of an oil-soluble metal dialkyl dithiophosphate in which the metal has an atomic number from 28 to 30, and a small amount sufficient to improve the antiwear properties of the emulsion within the range from about 0.1% to about 10% by weight based on the total of said oil and said water of a water-soluble member selected from the group consisting of tri-lower alkanolamine borates and lower alkanolamine salts of boric acid.

9. The emulsion of claim 8 having about 30 to 50 weight percent water and about 50 to 70 weight percent mineral oil, based on the total weight of the water and mineral oil in the emulsion.

10. The emulsion of claim 8 in which the mineral oil employed has a viscosity of about 70 to 110 SUS at 100° F.

11. The emulsion of claim 8 in which the water-soluble member having antiwear properties is triisopropanolamine borate.

12. The emulsion of claim 11 in which triisopropanolamine borate is employed in an amount of about 0.5 to 5 weight percent, based on the total weight of the mineral oil and water in the emulsion.

13. The emulsion of claim 8 in which the water-soluble member having antiwear properties is triethanolamine salt of boric acid.

14. The emulsion of claim 13 in which the triethanolamine salt of boric acid is employed in an amount of about 0.5 to 5 weight percent, based on the total weight of the mineral oil and water in the emulsion.

15. The emulsion of claim 8 in which the oil-soluble emulsifier and the oil-soluble metal dialkyl dithiophosphate are each present in an amount of about 0.5 to 5 weight percent, based on the weight of the mineral oil in the emulsion.

16. A stable, water-in-oil emulsion suitable for use as a hydraulic fluid at high pressures consisting essentially of an emulsion having about 20 to 80 weight percent water dispersed in about 20 to 80 weight percent mineral oil of lubricating viscosity, said emulsion containing a small amount effective to disperse said water in said oil of an oil-soluble emulsifier selected from the group consisting of calcium aromatic sulfonates and barium aromatic sulfonates, in combination with a polyoxyethylene derivative of hexitol anhydride long chain fatty acid mono-esters containing about 2 to 25 moles of ethylene oxide per mole of ester, and long chain fatty acid tri-esters of hexitol anhydride, wherein the fatty acid portion of said partial esters contains 12 to 24 carbon atoms per molecule, a small amount sufficient to impart antiwear properties to said emulsion of an oil-soluble metal dialkyl dithiophosphate in which the metal has an atomic number from 28 to 30, and a small amount sufficient to improve the antiwear properties of said emulsion within the range from about 0.1% to about 10% by weight based on the total of said oil and said water of a water-soluble member selected from the group consisting of tri-lower alkanolamine borates and lower alkanolamine salts of boric acid.

17. The emulsion of claim 16 in which triisopropanolamine is employed as the water-soluble member having antiwear properties, in an amount of about 0.5 to 5 weight percent, based on the total weight of the mineral oil and water in the emulsion.

18. The emulsion of claim 16 in which the triethanolamine salt of boric acid is employed as the water-soluble member having antiwear properties, in an amount of about 0.5 to 5 weight percent, based on the total weight of the mineral oil and water in the emulsion.

References Cited

UNITED STATES PATENTS

| | | | |
|---|---|---|---|
| 2,126,173 | 8/1938 | Clapsadle et al. | 252—75 |
| 2,312,208 | 2/1943 | Clayton et al. | 252—75 |
| 2,566,926 | 9/1951 | Burghart | 252—75 |
| 3,046,230 | 7/1962 | Berger | 252—75 |
| 3,152,990 | 10/1964 | Coppock et al. | 252—75 X |
| 3,222,284 | 12/1965 | Cook | 252—75 |
| 3,360,468 | 12/1967 | Dieman et al. | 252—75 |

LEON D. ROSDOL, Primary Examiner

D. SILVERSTEIN, Assistant Examiner

U.S. Cl. X. R.

252—76, 78, 79, 49.6